US011553597B2

(12) United States Patent
Muelders

(10) Patent No.: US 11,553,597 B2
(45) Date of Patent: Jan. 10, 2023

(54) THREE-DIMENSIONAL LIGHT EMITTING APPLIANCE

(71) Applicant: Lumileds LLC, San Jose, CA (US)

(72) Inventor: Barbara Muelders, Aachen (DE)

(73) Assignee: Lumileds LLC, San Jose, CA (US)

( * ) Notice: Subject to any disclaimer, the term of this patent is extended or adjusted under 35 U.S.C. 154(b) by 282 days.

(21) Appl. No.: 16/909,727

(22) Filed: Jun. 23, 2020

(65) Prior Publication Data

US 2020/0408367 A1    Dec. 31, 2020

(30) Foreign Application Priority Data

Jun. 28, 2019    (EP) .................................... 19183302

(51) Int. Cl.
| | |
|---|---|
| G06F 30/00 | (2020.01) |
| H05K 3/00 | (2006.01) |
| F21K 9/00 | (2016.01) |
| G06F 30/39 | (2020.01) |
| G06F 30/10 | (2020.01) |

(Continued)

(52) U.S. Cl.
CPC .......... H05K 3/0005 (2013.01); G06F 30/10 (2020.01); G06F 30/39 (2020.01); H01L 25/167 (2013.01); H05K 1/0284 (2013.01); F21K 9/90 (2013.01); F21Y 2115/10 (2016.08); G06F 30/15 (2020.01); G06F 2115/12 (2020.01);
(Continued)

(58) Field of Classification Search
None
See application file for complete search history.

(56) References Cited

U.S. PATENT DOCUMENTS

| | | | |
|---|---|---|---|
| 10,055,530 B1 | 8/2018 | Sinivaara et al. | |
| 10,538,028 B2 * | 1/2020 | Rogers .................. | B32B 27/283 |

(Continued)

FOREIGN PATENT DOCUMENTS

CN    202158382 U    3/2012

OTHER PUBLICATIONS

"European Application Serial No. 19183302.9, European Search Report dated Jan. 8, 2020", 7 pgs.

(Continued)

*Primary Examiner* — Leigh M Garbowski
(74) *Attorney, Agent, or Firm* — Schwegman Lundberg & Woessner, P.A.

(57) ABSTRACT

Inter-alia, a method for manufacturing a three-dimensional light emitting appliance is disclosed, said method comprising: providing a first data model of a three-dimensional area; arranging a plurality of spots for light emitting devices on the three-dimensional area of the first data model, wherein the plurality of spots is substantially evenly distributed over at least a part of the three-dimensional area; transforming the first data model of the three-dimensional area comprising the spots into a substantially two-dimensional and flat second data model, wherein the position of the spots on the second data model is derived; manufacturing a printed circuit board in accordance with the second data model and arranging pads of the printed circuit board on the spots of the second data model; equipping the pads of the printed circuit board with light emitting devices; and bringing the printed circuit board into the shape of the three-dimensional area. Further, a three-dimensional light emitting appliance is disclosed.

15 Claims, 2 Drawing Sheets

(51) Int. Cl.
    *H05K 1/02*           (2006.01)
    *H01L 25/16*         (2006.01)
    *F21Y 115/10*       (2016.01)
    *G06F 115/12*       (2020.01)
    *G06F 30/15*         (2020.01)
    *F21K 9/90*          (2016.01)

(52) U.S. Cl.
    CPC .............. *H05K 2201/10106* (2013.01); *H05K 2201/2054* (2013.01)

(56) References Cited

U.S. PATENT DOCUMENTS 10,690,302 B1 *   6/2020   Brooks ................. H05B 45/20
2019/0098763 A1    3/2019   Heikkinen et al.

OTHER PUBLICATIONS

"International Application Serial No. PCT/EP2020/065426, International Search Report dated Jul. 27, 2020", 3 pgs.
"International Application Serial No. PCT/EP2020/065426, Written Opinion dated Jul. 27, 2020", 6 pgs.

\* cited by examiner

THREE-DIMENSIONAL LIGHT EMITTING APPLIANCE

PRIORITY APPLICATION

This application claims the benefit of priority to European Patent Application Serial Number 19183302.9, filed 28 Jun. 2019, which is incorporated herein by reference in its entirety.

FIELD OF THE INVENTION

The present disclosure relates to a manufacturing method for a three-dimensional light emitting appliance, in particular for a three-dimensional light emitting appliance for a car interior. The present disclosure also relates to a three-dimensional light emitting appliance manufactured by the aforementioned method.

BACKGROUND OF THE INVENTION

In todays car industry the interior of the car itself becomes more and more important to the buyer of a vehicle. This trend is emphasized by the rise of advanced driver assistance systems and automated driving. Due to the increase of automation the driver and/or passengers spend more time of the journey focusing on their surroundings and thus the interior of the vehicle.

Current car interior lighting is often reduced to functional lighting, e.g. reading lights. Researches show that future interior lighting is expected to be situationally configurable and ambient related. Furthermore, it is expected that future interior car lighting can be personalized by the driver and/or the passengers.

Added value can for example be achieved by being able to change the interior lighting into multiple colors or by dimming the interior lighting. Furthermore, additional value can be achieved by integrating the lighting into traditional interior components of cars, such as a dashboard or the interior of a door for example.

From U.S. Pat. No. 10,055,530 B1 a method for computer aided design and subsequent manufacturing of electrical circuits in connection with three-dimensional structures established from initially substantially flat elements is known. For this purpose design inputs such as the mechanical target structure (for example the three-dimensional target design), the target circuit, the substrate and/or the process parameters are used in order to determine a mapping between the locations of the three-dimensional target design and the substrate. The mapping is generated by unfolding the three-dimensional target design into unfolded initial substrate and generating an output which indicates the mapping between different locations of the unfolded and folded versions of the unformed and formed versions of the substrate.

The CN 202158382 U shows a lighting device comprising a model seat, at least one flexible circuit board and a plurality of light-emitting diodes. The flexible circuit board is used for wrapping the model seat and the plurality of light-emitting diodes are installed on the flexible circuit board.

SUMMARY OF THE INVENTION

It is thus, inter alia, an object of the invention to provide a method for manufacturing a three dimensional light emitting appliance as well as a three-dimensional light emitting appliance which can improve the experience of the user and be fitted easily into the users surroundings, especially in the area of interior car lighting.

According to a first exemplary aspect of the present invention, a method for manufacturing a three-dimensional light emitting appliance is disclosed, the method comprising:

providing a first data model of a three-dimensional area;
arranging a plurality of spots for light emitting devices on the three-dimensional area of the first data model, wherein the plurality of spots is substantially evenly distributed over at least a part of the three-dimensional area;
transforming the first data model of the three-dimensional area comprising the spots into a substantially two-dimensional and flat second data model, wherein the position of the spots on the second data model is derived;
manufacturing a printed circuit board in accordance with the second data model and arranging pads of the printed circuit board on the spots of the second data model;
equipping the pads of the printed circuit board with light emitting devices; and
bringing the printed circuit board into the shape of the three-dimensional area.

According to a second exemplary aspect of the present invention, a three-dimensional light emitting appliance is proposed, wherein the light emitting appliance is manufactured according to one of the methods according to the first exemplary aspect of the present invention, as disclosed above and wherein the first data model is a computer aided design data model of a three-dimensional surface of a car interior.

Exemplary embodiments of the first and/or second exemplary aspect of the present invention may have one or more of the properties and/or features described below:

According to the first exemplary aspect of the present invention, the first data model may for instance be a CAD (Computer aided design) data model. Such a CAD data model of a three-dimensional area is provided. The first data model (e.g. CAD data model) of the three-dimensional area may in an exemplary embodiment be provided in form grid structure. Alternatively, the first data model (e.g. CAD data model) of the three-dimensional area may be provided in form of a first data model (e.g. CAD data model) which corresponds to an entire structure, for example a car dashboard. A CAD data model in this context refers to any digital model of a component, or a part of it. The component can for example be a component of a car interior, such as a car dashboard or the interior of a car door, to name but a few non-limiting examples.

It is preferred that the plurality of spots for the light emitting devices on the three-dimensional area of the CAD data model are arranged in a grid wise manner, wherein the size is of each if the plurality of spots is preferably substantially identical. Furthermore, it is preferred that the size of each of the plurality of the spots corresponds to the size a light emitting device needs to be connected to a PCB (printed circuit board) via a pad. The plurality of spots is substantially evenly distributed over the three-dimensional area, so that the light emitting devices in the three-dimensional light emitting appliance are substantially equidistant to each other. This leads to a homogeneous light emitting appliance. It is preferred that the size of the arranged spots corresponds to the size of LEDs or rather to the size of the dies of LEDs with whom the PCB may be equipped.

By transforming the CAD data model of the three-dimensional light area comprising the spots into a substantially two-dimensional and flat second data model, a substantially two-dimensional model of a PCB can be manufactured. Such a second data model may for instance be a CAM (Computer aided manufacturing) data model. Since the plurality of spots in the three-dimensional area is evenly distributed over at least a part of the three-dimensional area, the plurality of spots is unevenly distributed on the two-dimensional and flat second data model (e.g. CAM data model). According to the two-dimensional and flat surfaced second data model (e.g. CAM data model) a PCB can be manufactured. A CAM data model in this context is referring to any model which can be used by a manufacturing machine in order to manufacture a PCB with the desired specifications.

Preferably, the PCB is manufactured by a photolithographic process wherein pads are arranged on the photolithographic processed PCB. The pads are arranged on the spots of the substantially two-dimensional and flat second data model (e.g. CAM data model). It is preferred that the pads are made out of a Nickel-Aluminum-alloy or out of Copper. The PCB itself is preferably manufactured out of electrically isolating material such as, for example, fiber-reinforced plastic. The used material may for instance be flexible. The PCB is furthermore equipped with conductor tracks in order to provide electrical energy to the pads or rather to the light emitting devices arranged on the pads. It is preferred that one light emitting device is arranged on each pad. Preferably, the light emitting devices are soldered onto the PCB, wherein a reflux oven may for instance be used to melt the solder. After equipping the pads of the PCB with the light emitting devices, the PCB is brought back into the shape of the three-dimensional area of the first data model (e.g. CAD data model). Alternatively, the PCB can also be brought back into the shape of the three-dimensional of the first data model (e.g. CAD data model) and subsequently be equipped with the light emitting devices. It may for instance be required to fix the light emitting devices upfront, e.g. by gluing or glue locking the light emitting devices so that during the soldering respective positions of the light emitting devices do not change. It is preferred that the PCB is brought into the shape of the three-dimensional area. For instance, this may depend on an amount of deformation the used material withstands. Further, depending on a geometry of the three-dimensional form which the three-dimensional light emitting appliance should have, only certain materials are suitable due to the amount of deformation being possible. For instance, a textile like work process may be performed and/or controlled, e.g. by making a cut development corresponding to the of metry of the three-dimensional form which the three-dimensional light emitting appliance should have. This leads to a light emitting appliance in which all light emitting devices are substantially equidistant to each other and evenly arranged over the surface of the three-dimensional light emitting appliance. Such a light emitting application may be used to replace a traditional car dashboard or the traditional interior of car doors.

According to an exemplary embodiment of the invention, each of the spots for the light emitting devices on the three-dimensional area of the first data model (e.g. CAD data model) is arranged substantially equidistant to the adjoining spots for light emitting devices. This leads to a uniform light distribution of the light emitting appliance. It is also preferred that the light emitting devices have a similar luminous intensity and/or that the brightness of the light emitting devices is substantially the same. This leads to a homogeneous and dynamic light emitting appliance.

According to another exemplary embodiment of the invention, each of the spots for the light emitting devices of the substantially two-dimensional and flat second data model (e.g. CAM data model) is arranged substantially non-equidistant to the adjoining spots for light emitting devices. The positions of the spots on the substantially two-dimensional and flat second data model (e.g. CAM data model) may for instance be derived from the positions of the spots on the first data model (e.g. CAD data model) of the three-dimensional area. Transforming the first data model (e.g. CAD data model) of the three-dimensional are into a substantially two-dimensional and flat second data model (e.g. CAM data model) enables manufacturing a PCB in a constructively simple way. Furthermore, after bringing the PCB back into the shape of the three-dimensional area, a homogenous light distribution is ensured.

According to another exemplary embodiment of the invention, each pad or at least each column of pads of the PCB is connected with one conductive track each so that each pad or at least each column of pads is enabled to be controlled separately. If each pad or at least each column of pads can be supplied with electrical power separately, a controlling means can address the light emitting devices or columns of the light emitting devices separately. Hereby, the light emitting appliance is highly variable and may be personalized depending on the needs, e.g. of a user. The light emitting appliance can, for example, be used to run different patterns by only addressing certain light emitting devices or certain columns of light emitting devices. This can be done by sequentially setting the light emitting devices or the columns of light emitting devices under electrical power. It is also preferred that the brightness of the single light emitting devices or columns of light emitting devices can be adjusted separately.

According to another exemplary embodiment of the invention, the pads of the PCB are equipped with LEDs (light emitting diodes) and/or LED dies, especially with RGB- or RGBW-LEDs. RGB in this context is referring to a RGB color space that is defined by three LED enabling chromaticities of the red, green, and blue additive primaries, enabled by such a RGB-LED. RGBW-LED in this context is referring to a RGB-LED enabling the RGB color space and which additionally comprises a "white" LED for enabling emitting of white light directly, without the need to mix RGB to emit white light as enabled by a RGB-LED. This leads to low energy consumption and long lifetime for the light emitting appliance. Alternatively and/or additionally phosphor-based LEDs can be used as light emitting devices. The LEDs may in particular comprise at least one semiconductor element such as a p-n-junction, a diode, and/or a transistor. For instance, the LEDs may be provided in form of separate or combined LED dies and/or LED packages, wherein in particular at least one of such a LED may be arranged on a substrate, e.g. a sapphire substrate. An LED package may further comprise a wavelength conversion element (e.g. based on phosphor) and/or may comprise at least one optical element such as a diffusing layer, a diffractive element (e.g. a lens) and/or a reflective element (e.g. a reflector cup). The LED or LEDs may for instance be integrated into an LED lead frame.

According to another embodiment of the invention, while or after equipping the pads with the light emitting devices a reflection film, an optical resin and/or an optical film is applied on the PCB. The reflection film is preferably applied directly onto the PCB and reinforces the luminous intensity of the light emitting devices. The optical resin is preferably applied onto the reflection film and seals the area around the light emitting devices. This protects the light emitting devices from moisture and form external impacts. The resin used is either clear or at minimum highly transparent to the emitted wavelength of the light emitting devices. The optical film is preferably applied onto the optical resin and protects the light emitting devices additionally from the environment.

According to another exemplary embodiment of the invention, a diffuser, especially a diffuser plate or a diffuser layer, is attached to the PCB. The diffuser enables the desired light distribution of the light emitting devices. A diffuser layer can be attached to the PCB separately. Additionally or alternatively, diffusing agents, for example silica, may be mixed into the aforementioned optical resin and/or optical film.

According to another exemplary embodiment of the invention, the distance between the spots of the three-dimensional model is between 0.25 and 2 cm, preferably between 0.75 and 1.5 cm. This leads to a desired density of light emitting devices on a three-dimensional light emitting appliance and thus to a satisfying user experience due to a high resolution of light emitting devices. Preferably the distance between the spots corresponds to the distance between the pads of the PCB.

According to another exemplary embodiment of the invention, the first data model is a CAD data model of a three-dimensional surface of a car interior. As aforementioned, it is desirable to improve the user experience due to the increase of automation in driving. By using such first CAD data model of a three-dimensional surface of a car interior, for example that of a dashboard or that of a door, a three-dimensional light emitting appliance can be provided for car passengers that can be highly individualized and creates a nice ambient atmosphere.

BRIEF DESCRIPTION OF THE DRAWINGS

Examples of the invention will now be described in detail with reference to the accompanying drawing, in which.

DETAILED DESCRIPTION OF THE EMBODIMENTS

The following description serves to deepen the understanding of the present invention and shall be understood to complement and be read together with the description as provided in the above summary section of this specification.

Figure 1:
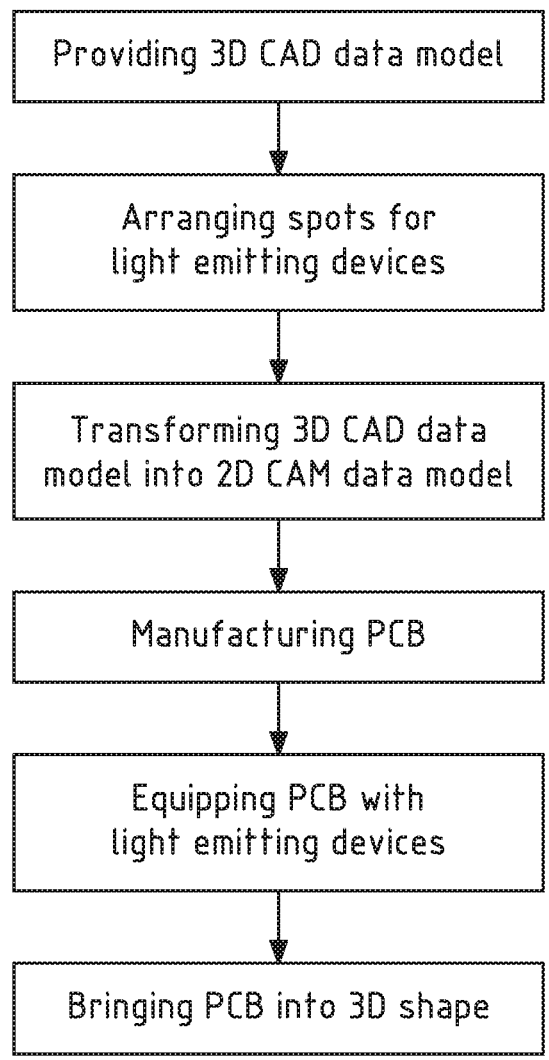
FIG. 1 shows a flowchart of an exemplary embodiment of a method for manufacturing a three-dimensional light emitting appliance.

FIG. 1 shows a flowchart of an exemplary embodiment of a method for manufacturing a three-dimensional light emitting appliance.

As can be seen in FIG. 1, the first step is to provide a three-dimensional CAD data model of a three-dimensional area. It is preferred that the three-dimensional area is an area and/or component of a car interior, such as a dashboard or the interior of a door.

The next step is to arrange spots or positions for light emitting devices on the three-dimensional CAD data model of the three-dimensional area. These spots are positioned evenly over the three dimensional area so that each spot is positioned substantially equidistant to a neighboring spot.

Afterwards, the three-dimensional CAD data model is transformed into a two-dimensional CAM model. This is done by deriving the position of the spots from the three-dimensional area to the substantially flat and two-dimensional surface. The spots thus are unevenly distributed over the two-dimensional surface so that the spots are not positioned equidistant to each other.

Now a PCB is manufactured according to the two-dimensional CAM data model. This is preferably done by a photolithographical process. Further, pads are arranged on the positions of the spots. Each of these pads is preferably connected individually with a conductor path and isolated to the other pads of the PCB.

Subsequently, the PCB is equipped with the light emitting devices wherein preferably one light emitting device is placed onto one pad of the PCB respectively. The PCB can furthermore be equipped with a reflection film, an optical resin, an optical film and/or a diffuser.

Finally, the PCB is brought into a three-dimensional form which corresponds to the three-dimensional form of the initial three-dimensional CAD data model. This leads to a light emitting appliance in which all light emitting devices are substantially equidistant to each other and evenly arranged over the surface of the three-dimensional light emitting appliance.

Figure 2:
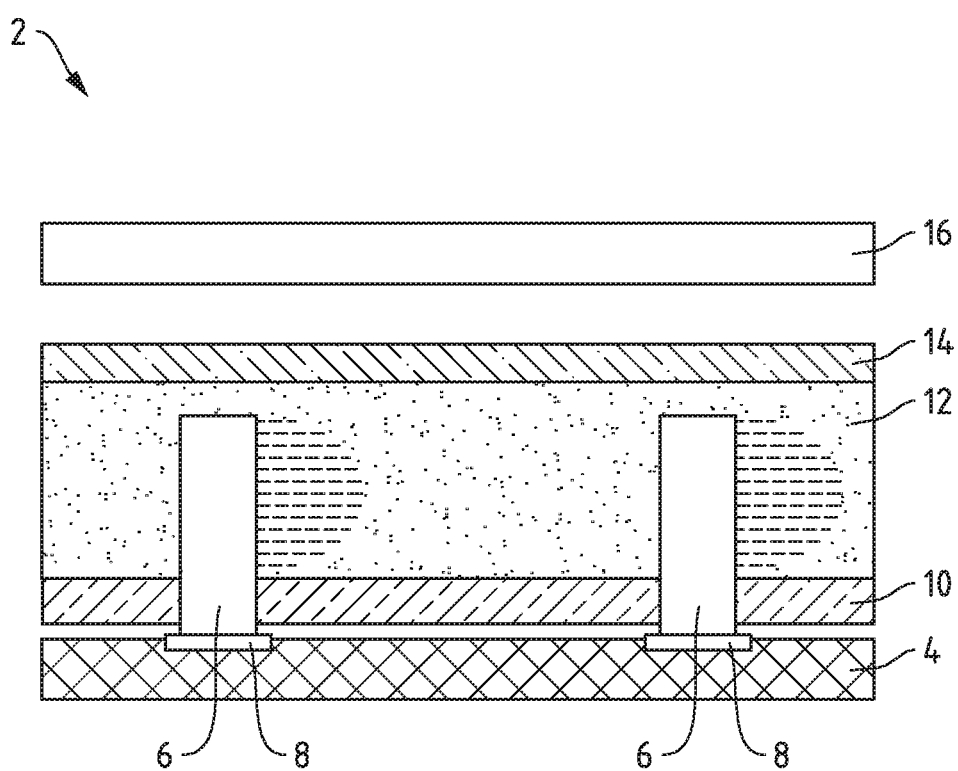
FIG. 2 shows a schematic cross-section of a part of an exemplary embodiment of a light emitting appliance.

FIG. 2 shows a schematic cross-section of a part of an exemplary embodiment of a light emitting appliance 2. The base of the light emitting appliance 2 is build by a PCB 4. Exemplary, two light emitting devices in form of LEDs 6 are soldered onto pads 8 of the PCB 4. A reflection film 10 is applied directly onto the PCB 4 which is covering the lower part of the LEDs 6. An optical resin 12 is applied onto the reflection film 10 and onto the LEDs 6 in order to seal the area around the LEDs 6. The optical resin 12 is enclosed by an optical film 14 which protects the LEDs 6 and the optical resin 12 e.g. from moisture and/or from external impacts. Spaced apart from the optical film 14 is a diffuser plate 16 to enhance the light distribution created by the LEDs 6.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/appliance) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. A method for manufacturing a three-dimensional light emitting apparatus, the method comprising:
  providing a first data model of a three-dimensional area;
  arranging a plurality of spots for light emitting devices on the three-dimensional area of the first data model, the plurality of spots being substantially evenly distributed over at least a part of the three-dimensional area;
  transforming the first data model of the three-dimensional area comprising the spots into a substantially two-dimensional second data model, positions of the spots on the second data model derived from positions of the spots on the first data model, positions of the spots on the second data model being unevenly distributed;
  manufacturing a printed circuit board in accordance with the second data model and arranging pads of the printed circuit board on the positions of the spots of the second data model;
  equipping the pads of the printed circuit board with light emitting devices; and
  bringing the printed circuit board into the shape of the three-dimensional area.

2. The method according to claim 1, wherein each of the spots of the first data model for the light emitting devices on the three-dimensional area is arranged substantially equidistant to adjoining spots for the light emitting devices.

3. The method according to claim 1, wherein each of the spots for the light emitting devices of the two-dimensional and flat surface is arranged substantially non-equidistant to adjoining spots for the light emitting devices.

4. The method according to claim 1, wherein the pads are formed in columns of pads such that each pad or each column of pads is coupled with a different conductive track to respectively control each pad or each column of pads separately.

5. The method according to claim 1, wherein the pads of the printed circuit board are equipped with LEDs, including at least one type of LED selected from RGB-LEDs and RGBW-LEDs as light emitting devices.

6. The method according to claim 1, wherein while or after equipping the pads with the light emitting devices, at least one film selected from films including a reflection film, an optical resin, and an optical film is applied on the printed circuit board.

7. The method according to claim 1, wherein a diffuser is attached to the printed circuit board.

8. The method according to claim 1, wherein a distance between the spots of the three-dimensional model is between about 0.25 cm and about 2 cm.

9. The method according to claim 1, wherein the first data model is a computer aided design data model of a three-dimensional surface of a car interior.

10. The method according to claim 9, wherein the light emitting devices are individually controllable by passengers within the car interior.

11. The method according to claim 1, wherein the second data model is a computer aided manufacturing data model.

12. A three-dimensional light emitting appliance, characterized in that,
  the three-dimensional light emitting appliance is manufactured according to claim 1; and
  the first data model is a computer aided design data model of a three-dimensional surface of a car interior.

13. The method according to claim 1, wherein a distance between the spots of the three-dimensional model is between about 0.75 cm and about 1.5 cm.

14. The method according to claim 1, wherein bringing the printed circuit board into the shape of the three-dimensional area comprises performing a textile-like work process on the printed circuit board manufactured in accordance with the second data model by making a cut development corresponding to a geometry of the three-dimensional area.

15. The method according to claim 14, wherein all light emitting devices in the three-dimensional area produced by the cut development are substantially equidistant to each other and substantially evenly arranged over a surface of the three-dimensional area.

* * * * *